June 4, 1957 W. J. EVERS ET AL 2,794,242

METHOD AND APPARATUS FOR ERECTING A STORAGE VESSEL

Filed June 10, 1953 5 Sheets-Sheet 1

INVENTORS:
William J. Evers
Albert F. Nystrom
BY Andrus & Sceales
ATTORNEYS.

June 4, 1957 W. J. EVERS ET AL 2,794,242

METHOD AND APPARATUS FOR ERECTING A STORAGE VESSEL

Filed June 10, 1953 5 Sheets-Sheet 2

INVENTORS:
William J. Evers
Albert F. Nystrom

BY Andrus & Sceales

ATTORNEYS.

METHOD AND APPARATUS FOR ERECTING A STORAGE VESSEL

Filed June 10, 1953 5 Sheets-Sheet 3

INVENTORS:
William J. Evers
Albert F. Nystrom
BY
Andrus & Sceales
ATTORNEYS.

METHOD AND APPARATUS FOR ERECTING A STORAGE VESSEL

Filed June 10, 1953

5 Sheets-Sheet 4

INVENTORS:
William J. Evers
Albert F. Nystrom

BY Andrus & Sceales

ATTORNEYS.

METHOD AND APPARATUS FOR ERECTING A STORAGE VESSEL

Filed June 10, 1953

5 Sheets-Sheet 5

INVENTORS:
William J. Evers
Albert F. Nystrom
BY Andrus & Sceales
ATTORNEYS.

United States Patent Office 2,794,242

Patented June 4, 1957

2,794,242

METHOD AND APPARATUS FOR ERECTING A STORAGE VESSEL

William J. Evers, Chicago, Ill., and Albert F. Nystrom, Prairie du Sac, Wis., assignors to A. O. Smith Corporation, Milwaukee, Wis., a corporation of New York Application June 10, 1953, Serial No. 360,644

22 Claims. (Cl. 29—429)

This invention relates to a method and apparatus for erecting a storage vessel such as a gas tank or a silo.

An object of the present invention is to provide an apparatus for erecting storage structures whereby the various cylindrical sections of the structure are successively joined to preceding sections at ground level and then are raised by the apparatus of the invention to the position they will occupy in the finished structure.

Another object is to provide a method for erecting a storage vessel whereby the roof is assembled at ground level as the initial step in the erection so as to eliminate costly scaffolding and supporting structure for the roof.

A further object is to provide an apparatus for erecting a storage structure which is located outside of the structure so that the apparatus may be readily disassembled on completion of the structure.

Another object is to provide a simple and inexpensive apparatus for erecting a storage vessel which will accurately and progressively elevate the completed portion of the vessel as each succeeding cylindrical section is attached thereto.

Another object is to provide a novel lifting head adapted to engage the nuts or other connecting members on the outer surface of the structure and thereby raise or lower the structure in accordance with movement of the head.

Another object is to provide a lifting head for use in suspending the roof panels of the structure while the same are joined together as a roof without need for underprops to support the panels.

Another object is to provide a method of assembling the roof of a storage structure whereby the roof segments are hung from a plurality of supporting members in preparation for being joined together to form the roof.

Other objects and advantages will appear in the course of the following description:

The present invention is directed to an apparatus for erecting a generally cylindrical storage structure, such as a silo, formed of a plurality of vertically disposed, adjoined, cylindrical sections. The structure is adapted to rest on a suitable foundation and is enclosed at the top by a generally curved roof which is formed of a plurality of arcuate segments.

According to the present invention the roof is initially assembled at ground level with use of the apparatus of the invention and thereafter elevated to a sufficient height to permit the uppermost cylindrical section of the structure to be attached thereto. After attachment of the uppermost section the structure is again elevated to permit attachment of the second cylindrical section, and this procedure is continued until the entire vessel has been assembled.

The apparatus for elevating the sections includes a plurality of vertically disposed jack assemblies which are circumferentially spaced outwardly of the structure and are adapted to raise or lower the complete portion of the structure in accordance with vertical movement thereof.

A pair of lifting heads are separately associated with each jack assembly. One head of each pair is adapted for use in assembling the roof and is designed to support a pair of pre-assembled adjoining roof panels or segments by removable engagement with the bolt heads or nuts connecting the adjacent panels together. By this construction each pair of roof panels is supported from above while intermediate panels are secured therebetween to form the completed roof.

The second lifting head associated with each jack assembly serves to support the cylindrical sections of the vessel, after completion of the roof, as the wall panels of the succeeding sections are secured to the section. These heads similarly engage the nuts on the exterior of the silo which serve to connect the wall panels together as a cylindrical section.

The heads move upwardly or downwardly in unison in accordance with rotary motion of the jacks to raise or lower the assembled structure.

Figure 1:
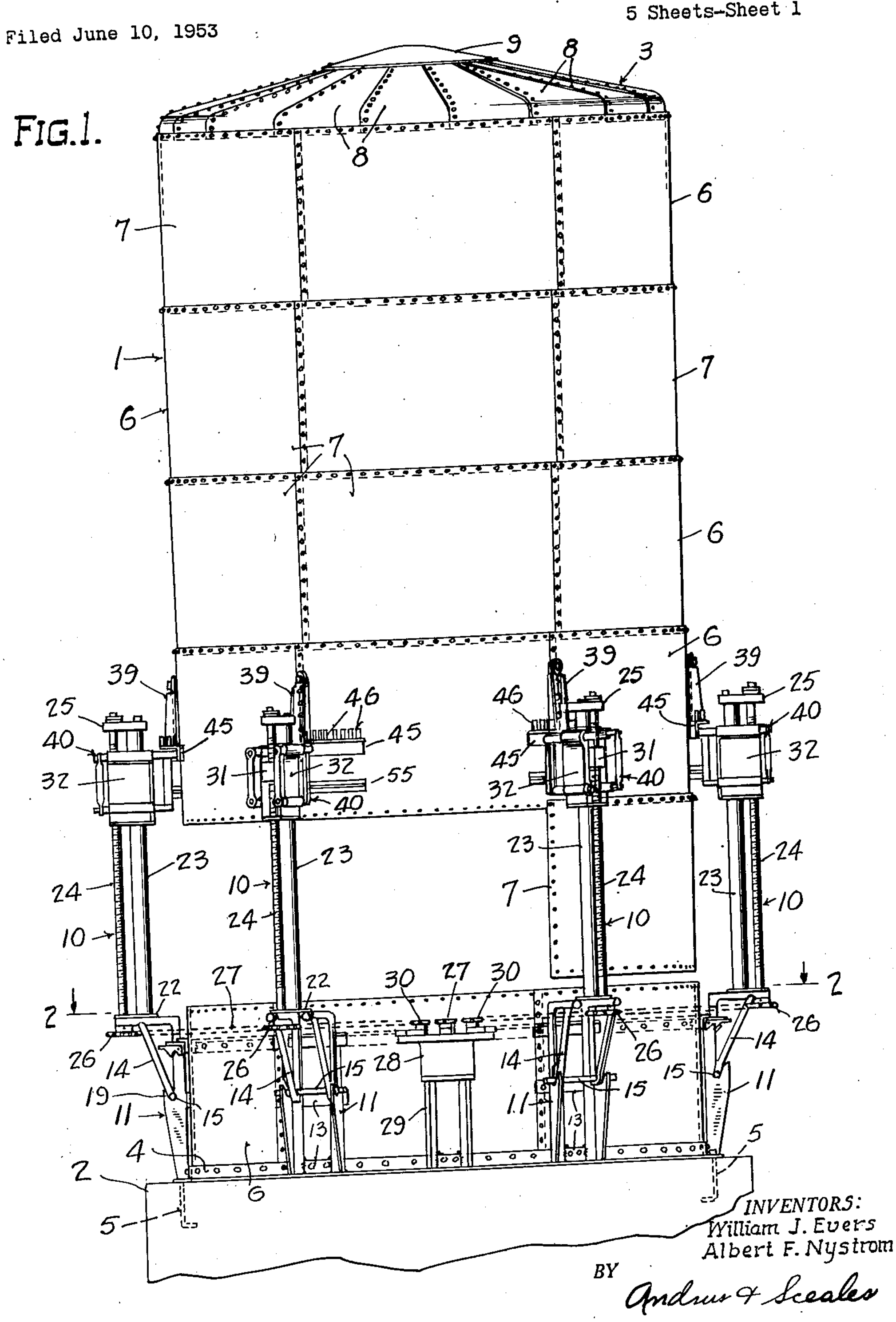
Figure 1 is a side elevation of a partially assembled storage vessel erected with use of the present invention.
Figure 3:
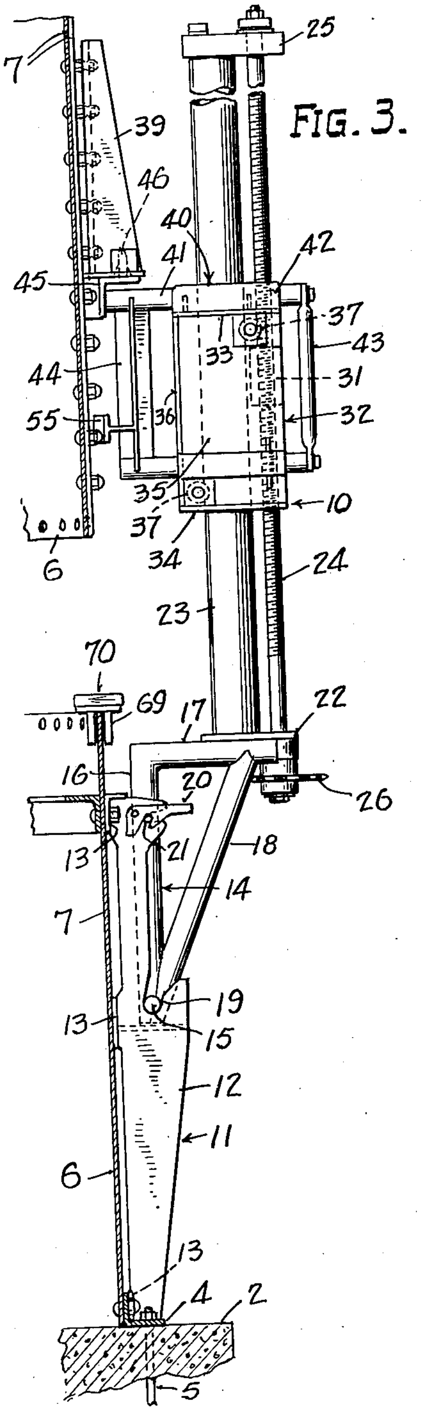
Fig. 3 is a side elevation of a jack as applied to the cylindrical body sections.
Figure 4:
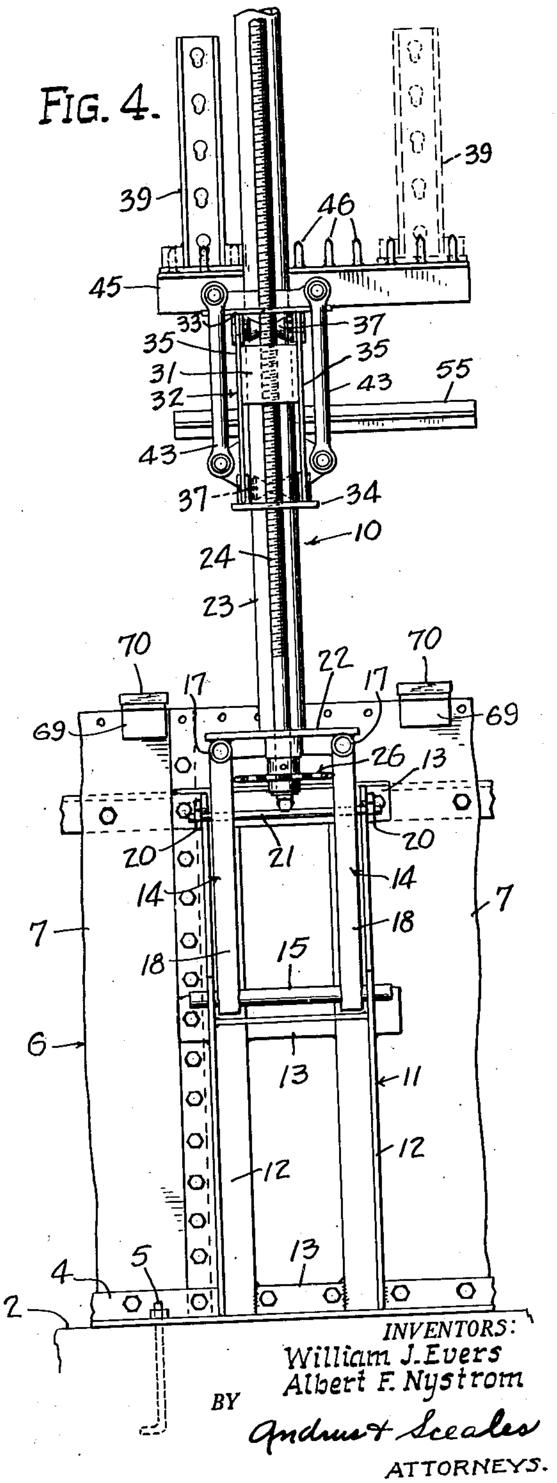
Fig. 4 is a front elevation of Fig. 3.

Referring to the drawings there is shown in Figure 1 a storage vessel or silo comprising a generally cylindrical body section 1 which is supported on a concrete foundation 2 and is enclosed at the top by a generally curved roof 3.

To secure the body portion of the silo to foundation 2, an annular base ring 4 is attached to the foundation by anchor bolts 5 and the lower circular edge of body section 1 is disposed within and secured to ring 4 by suitable bolts.

The body section 1 is composed of a plurality of generally cylindrical sections 6 each of which is formed of a plurality of arcuate panels 7 secured together along adjacent vertical edges by bolts to form the cylindrical sections.

The upper circular edge portion of each section 6 overlaps the lower edge portion of the preceding upper section so that no internal ledges or ridges will be present in the silo to obstruct the downward movement of the contained material. The overlapping edge portions of the respective sections are secured together by bolts or the like.

The roof 3 is formed of a plurality of pie-shaped panels 8 which are joined together along their side edges and secured together at the center of the silo by a circular crown 9.

The apparatus to erect the silo or storage structure includes a plurality of jack assemblies 10 which are circumferentially spaced about the outer surface of the preassembled lowermost of the sections 6 and are adapted to successively engage and elevate the roof 3 and each succeeding section 6 until the silo is completely assembled.

The jack assemblies 10 are connected to the lowermost of the cylindrical sections 6, which are attached to base ring 4, by fixed lower braces 11. Braces 11 are secured to the outer surface of the lowermost cylindrical section and removably support the corresponding jack assemblies.

The lower braces 11 comprise a pair of spaced vertically disposed angle bars 12 which are connected together at their upper, middle and lower portions by brackets 13. The brackets 13 are secured flatwise against the lowermost section 6 by bolts, or the like, and wherever possible, bolts used in the assembly of the lowermost section are employed for this purpose. For example, the lowermost of the brackets 13 may be attached to the base ring 4 by the bolts employed to connect the section 6 to the ring 4, the middle brackets 13 can be connected to the section 6 by means of the bolts which are utilized to join the vertical edge of the panels 7 together, and the upper brackets may be attached to section 6 through a series of bolts employed to connect an internal shelf support to the section.

Each jack assembly 10 includes a supporting structure which engages the respective braces and carries the elevating mechanism. The supporting structure comprises a pair of spaced tubular vertically disposed supports 14 which extend upwardly from a horizontal shaft 15. The upper end of each support 16 is joined to an outwardly extending horizontal tubular support 17. To provide an integral supporting structure, the outer ends of horizontal supports 17 are connected to the shaft 15 by a pair of diagonal supports 18.

To engage the jack assemblies 10 with the corresponding braces 11, the central portions of the outwardly extending flanges of angle bars 12 of braces 11 are provided with notches 19 which are adapted to receive the shaft 15 of jack assemblies 10.

As the weight of the entire silo during erection is transmitted through shaft 15 to the braces 11, the portions of the angle bars 12 in the area of the notches 19 may be suitably reinforced to withstand this thrust.

To lock each jack assembly 10 to the respective brace 11, a latch 20 is pivotally attached to the upper portion of each bar 12 and is adapted to engage a horizontal rod 21 which connects the vertical supports 16 of jack assembly 10 and extends laterally beyond each of the supports 16. The supporting structure of jack assemblies 10 is readily connected to the corresponding braces 11 by initially inserting shaft 15 within the notches 19 in bars 12 and thereafter swinging the jack assembly upwardly to effect locking engagement of rod 21 with the latch 20.

The elevating mechanism of jack assemblies 10 includes a base 22 which is secured by welding or the like across the horizontal supports 17 of support members 11. The base 22 supports a vertical column 23, and an externally threaded screw member 24 is spaced outwardly of column 23 and extends downwardly through a suitable aperture in base 22. The upper extremities of the screw and the column are suitably connected by a cap 25 and during the erection operation the downward thrust on the screw 24 is transmitted to the column 23 through the cap 25.

The extreme lower end of screw 24 is keyed to a sprocket 26, which when rotated through a chain drive 27 by motor unit 28, turns screw 24. The motor unit 28 is supported on a suitable platform 29 attached to the lowermost section 6. To maintain proper tension on the chain drive 27 a pair of adjustable sprockets 30 are disposed on either side of the drive sprocket and the tension in the chain may be varied through adjustment of the sprockets 30.

Rotation of screw member 24 results in vertical movement of a nut 31 which is threadedly engaged with the screw member.

The nut 31 is secured within a nut housing 32 which includes a top plate 33 and a bottom plate 34, both of which have suitable aligned openings for the reception of the column 23 and screw member 24.

The plates 33 and 34 are connected by a pair of spaced side walls 35 and a rear plate 36 to form the generally box-shaped housing 32. Nut 31 is secured between side walls 35 in position to threadedly receive screw member 24. Rotation of screw 24 causes a vertical movement of nut 31 and the housing 32.

To facilitate vertical movement of housing 32 on the fixed column 23, a pair of rollers 37 are rotatably secured between side walls 35 in position to ride on column 23. One of the rollers 37 is disposed at the upper end of housing 32 outwardly of the column 23 while the other of the rollers 37 is located at the lower end of housing 32 inwardly of the column. The rollers 37 are located at the positions of greatest friction between the housing 32 and column 23 resulting from a counterclockwise moment of the housing about the column 23 due to the weight of the silo sections 6 carried by the jack assemblies. Thus, with the use of rollers 37 the housing will be able to move freely on the guide column 23.

The silo roof panels 8 and cylindrical body sections 6 are supported during erection by roof lifting heads 38 and side wall lifting heads 39, respectively, which are carried by frame 40 attached to each nut housing 32. The heads 38 and 39 are adapted to be removably attached to the nuts which are threadedly engaged on the outside of the silo to the bolts joining the adjacent silo panels together.

The frame 40 comprises two pairs of horizontally disposed rods 41 mounted for sliding movement within corresponding tubular sleeves 42. The upper pair of sleeves 42 straddle column 23 and are secured by welding to top plate 33 of housing 32 while the lower pair of sleeves similarly straddle column 23 and are secured to suitable lugs which extend laterally from side walls 35. By this construction the frame 40 can be adjusted radially with respect to the silo to insure proper engagement between the respective heads 38 and 39 and the silo nuts at all times.

To maintain alignment of rods 41 within the respective sleeves 42, the outer end of each rod is connected to the respective vertically aligned rod by tie rods 43. Similarly the inner end of each rod is connected to the corresponding vertically aligned rod by bars 44.

To support the lifting heads 38 and 39, an angle bar 45, shaped in conformity with the curvature of the silo, is secured across the inner ends of the upper pair of rods 41. The angle bar 45 is provided with a plurality of upstanding, spaced pegs 46 which are adapted to be received within suitable apertures in the heads 38 and 39 and maintain alignment of the heads on the frame 40.

As it is desirable for structural reasons to offset the vertical joints between panels of the cylindrical sections 6, as shown in Figure 1, and as the jack assemblies 10 are fixed in relation to the sections 6, a plurality of pegs 46 are employed so that the heads 39 which are attached to the nuts at the vertical joint between panels 7 may engage the pegs 46 regardless of the position of the vertical joint in respect to the jack assembly. For example, when carrying the uppermst of the sections 6, the head 39 is engaged with the first, second and third pegs at the extreme right hand end of the bar 45, as one faces the silo. As the vertical joint of the uppermost cylindrical section 6 is offset from the corresponding joint of the next lower section, the head 39 engages the second, third and fourth pegs from the right-hand end of the bar when lifting the second section. As each succeeding cylindrical section 6 is brought into position, the head engages the next series of three pegs. Thus, the spacing between pegs is determined by the offset of the vertical joints and the number of pegs employed depends on the number of cylindrical sections 6 to be elevated.

The joints between roof panels 8 are positioned such that the head 38 may engage any series of three pegs on bar 45.

Figure 5:
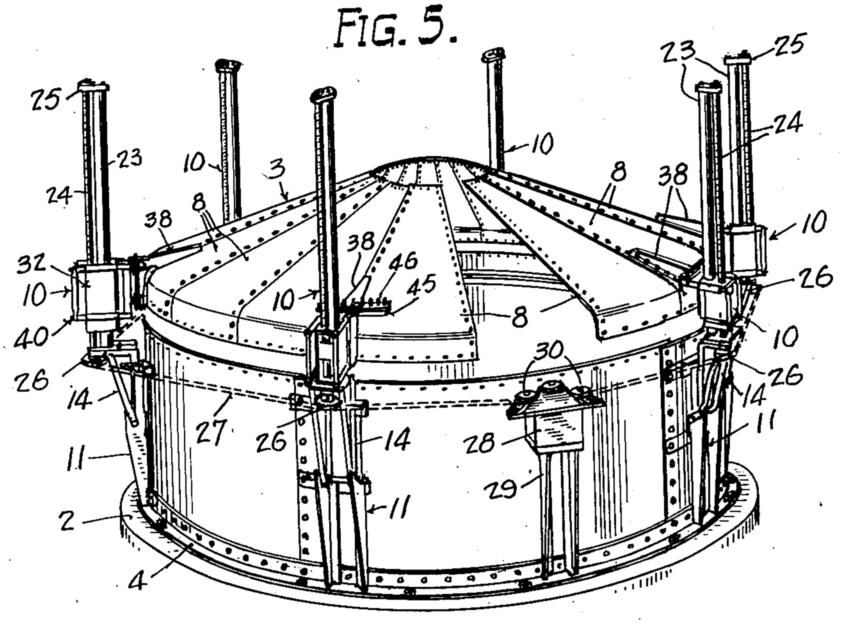
Fig. 5 is a perspective view of the partially assembled structure showing the assembly of the roof panels.
Figures 6, 7:
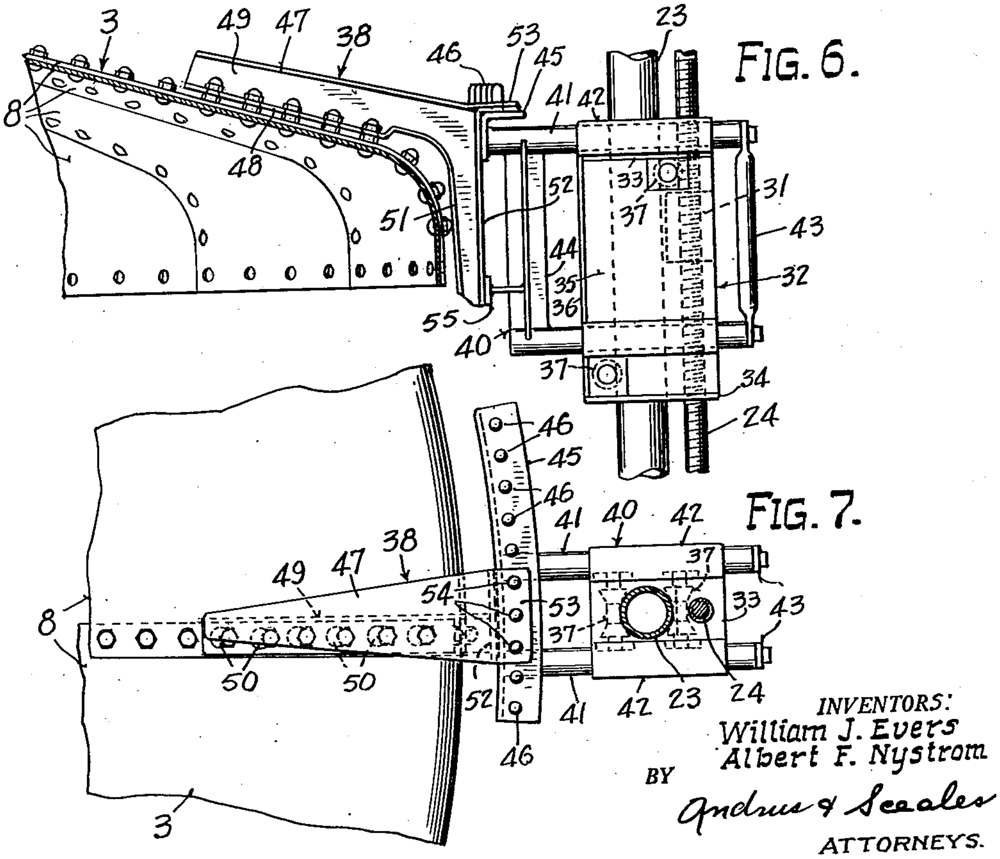
Fig. 6 is an enlarged fragmentary side elevation of a jack showing the method of supporting the roof panels.
Fig. 7 is a top plan view of Fig. 5.
Figure 2:
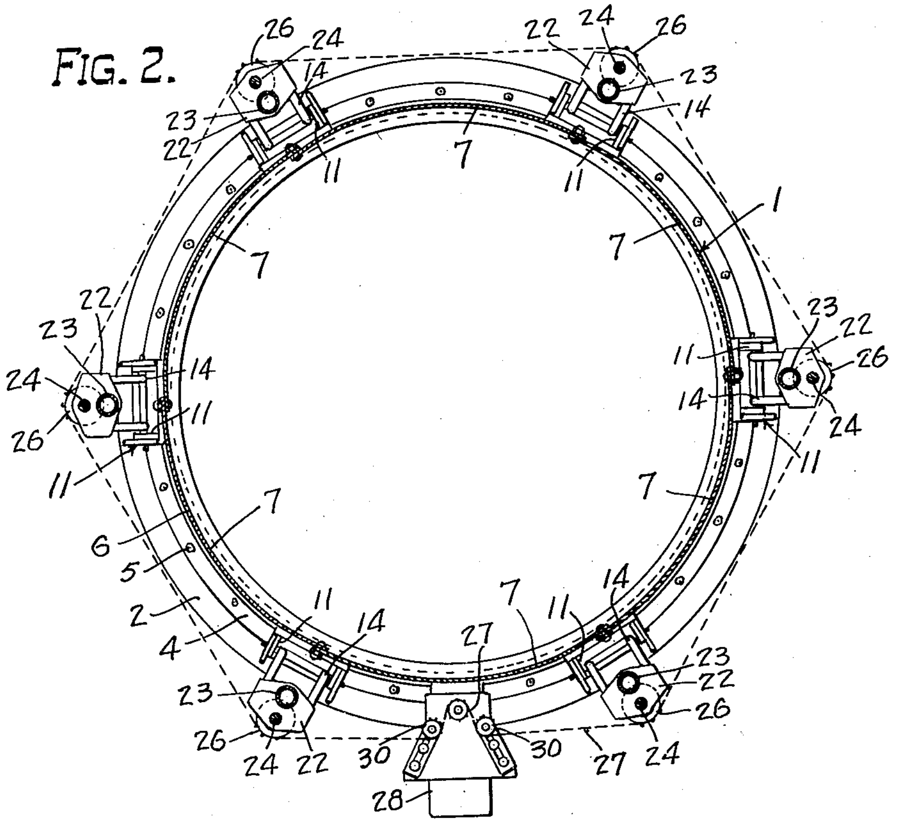
Fig. 2 is a sectional view of the vessel taken along line 2—2 of Figure 1.
Figure 8:
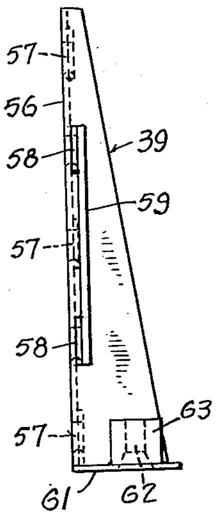
Fig. 8 is a side elevation of the nut clamping head which is adapted to engage the cylindrical sections of the vessel.
Figure 9:
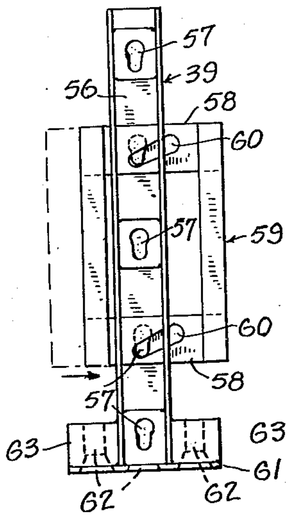
Fig. 9 is a front elevation of the nut clamping head of Fig. 8.

The roof panel head 38, as shown in Figs. 5, 6, and 7, comprises an upper plate 47 and a lower plate 48 which are connected by web 49. To engage the nuts on the outside of the roof panels 8, the lower plate 48 is provided with a plurality of spaced keyhole-shaped openings 50. The nuts disposed along the joint between roof panels 8 are adapted to be received within the larger portion of the respective keyhole openings 50, and by driving the head 38 forwardly, the necked-down portions of the nuts are engaged within the smaller portion of the openings 50, thereby firmly restraining the nuts and roof panels from relative vertical movement.

Figure 10:
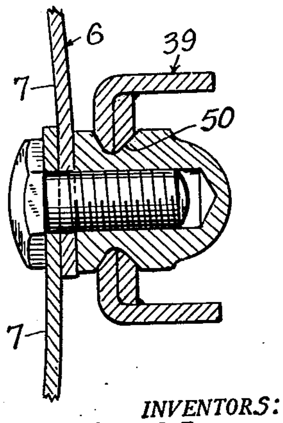
Fig. 10 is transverse section of a typical nut as engaged by the lifting head.
Figure 11:
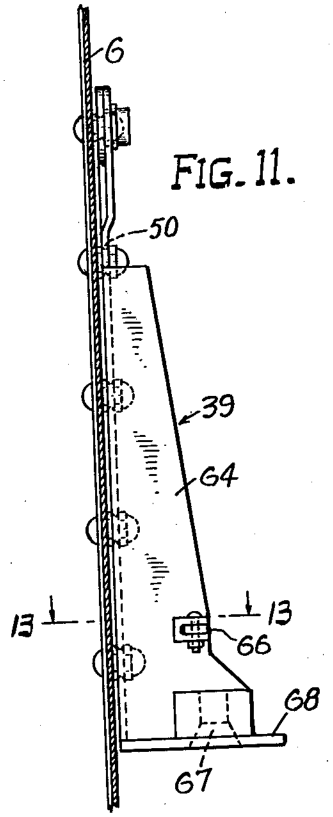
Fig. 11 is a second embodiment of the nut clamping head of the type adapted to engage the cylindrical sections.
Figure 12:
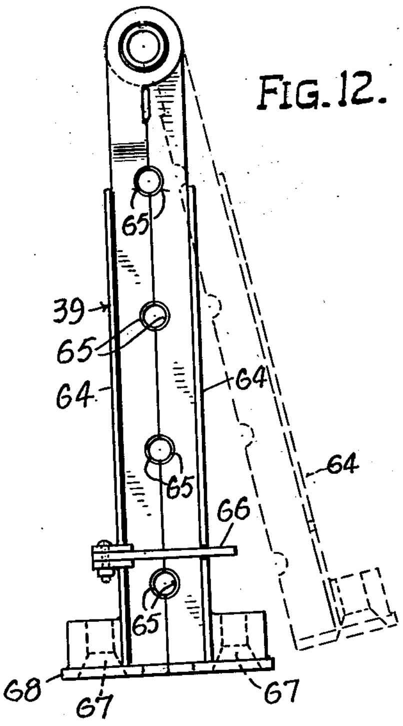
Fig. 12 is a rear elevation of the head of Fig. 11 with the open position thereof shown dotted.
Figure 13:
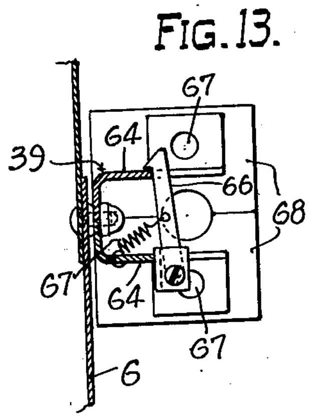
Fig. 13 is a transverse section taken along line 13—13 of Fig. 11 and showing the locking mechanism.
Figure 14:
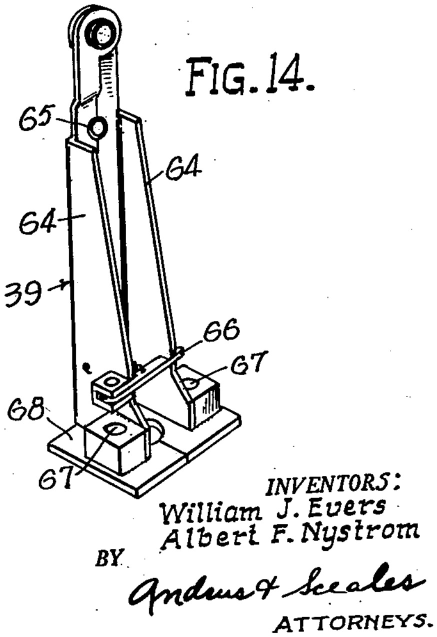
Fig. 14 is a perspective view of the clamping head of Fig. 11.

The nuts employed in the structure, as seen in Fig. 10, are designed with a central decreased-diameter neck so that the edges of the steel panels bordering the openings 50 will engage the neck and firmly hold the nuts. During erection the entire weight of the structure is carried by the nuts and the threadedly engaged bolts.

The outer portion of the lower plate 48 of the roof panel head is bent downwardly, as indicated by 51, to conform to the general shape of the silo. The upper plate 47 terminates outwardly of the silo and the outer edge portion of plate 47 is joined flatwise by welding to the upper horizontal flange of back plate 52 to provide an outwardly extending reinforced flange 53. The web 49 connects the lower portion 51 of plate 48 and back plate 52 to provide a rigid integral structure.

The head 38 is attached to the frame 40 by the engagement of pegs 46 within complementary openings 54 in the flange 53. The openings 54 are spaced in accordance with the spacing of pegs 46, and to provide an adequate and stable attachment, three such openings are provided in the flange 53 as seen in Fig. 7.

To balance the moment arm produced when the roof panels 8 are suspended from the head 38, the frame 40 is provided with an elongated bearing pad 55 having a T-shaped cross section which is disposed horizontally across bars 44. The lower portion of back plate 52 normally bears against the pad 55 and prevents tilting or pivoting of the head due to the weight of the roof panel suspended therefrom.

The side wall heads 39, as shown in Figs. 3, 4, 8, and 9, are adapted to be inserted on frame 40 and serve to engage the projecting vertically spaced nuts on the outer surface of the sections 6 and lift the sections on assembly thereof. Each side wall head 39 comprises a generally channel-shaped, vertically disposed back plate 56 having the web portion thereof provided with suitable vertically spaced keyhole-shaped openings 57 adapted to receive and engage the nuts in a manner similar to that in which the nuts are engaged within openings 50 of roof panel heads 38.

To lock the nuts within openings 57 the side flanges of channel member 56 are provided with two pairs of aligned openings which slidably receive the respective horizontal arms 58 of a rectangular lock frame 59. The arms 58 of lock frame 59 are provided with diagonal apertures 60 which register with the openings 57 in channel 56.

By sliding lock frame 59 in the direction of the upper end of diagonal aperture 60, the head is moved relatively to the engaged nuts thereby forcing the lower portion of keyhole openings 57 into engagement with the nuts. Conversely, if the lock frame 59 is moved in the opposite direction, the upper enlarged portions of keyhole openings 57 are brought into registry with the nuts and the heads may then be disengaged from the nuts and the sections 6.

In order to engage pegs 46 of frame 40, the side wall heads 39 include a base plate 61, which is secured to the lower end of back plate 56 and is provided with a plurality of spaced openings 62 located in position to receive the respective pegs 46. The outer openings 62 of the three shown in Figs. 8 and 9 may be provided with reinforcing bosses 63. With pegs 46 inserted within openings 62 the cylindrical sections 6 may be raised or lowered in accordance with movement of jack assemblies 10.

There is shown Figs. 11–14, a second embodiment of the side wall head 39. In this embodiment the head comprises a channel member which is divided centrally into two complementary halves or sections. The sections 64 normally have abutting inner vertical edges and are pivotally connected at their upper ends to permit the sections to be separated.

To engage the vertically spaced nuts on the exterior of the silo, the inner edge portions of sections 64 are provided with matching semi-circular notches 65, and the necked-down portion of the nuts is adapted to be engaged and held within the complementary notches.

In order to lock the sections 64 together when the nuts are engaged within the notches 65 therein, a spring biased latch 66 is pivotally connected to the outwardly extending flange of one of the sections 64. The latch 66 is urged inwardly by spring 67 thereby biasing the hooked end of latch 66 into locking engagement with the flange of the opposite section 64.

The side wall head 39 is connected to the jack assemblies 10 by engagement of pegs 46 within correspondingly spaced openings 67 in base plates 68 of the head, in a manner similar to the engagement shown in the first embodiment of the side wall head.

To begin assembly of the silo, the concrete foundation 2 is poured and the circular base angle ring 4 is secured in proper position thereon by anchor bolts 5. A series of panel sheets 7 are then bolted to the base ring 4 and to each other along their adjacent overlapping vertical edges to form the lowermost of the cylindrical sections 6. A suitable mastic may be used to seal the overlapping edges of the panels before the attachment of the panels is accomplished.

With the lowermost of the sections 6 erected, the supporting braces 11 are secured in the proper spaced relation to the outer surface of the lowermost section.

After the braces 11 have been secured to the lowermost cylindrical section, the jack assemblies 10 are inserted into engagement with the respective braces 11 and swung upwardly into the vertical locked position.

The motor platform 29 is attached to the lowermost section 6 and the motor unit 28 is installed thereon. The drive system is completed by the engagement of the sprocket chain 27 with the respective jack sprockets 26 and tensioning sprockets 30.

The next operation is to assemble roof 3 and to accomplish this, the nut housings 32 of jack assemblies 10 are leveled and run up to a suitable working height through operation of motor 28 in preparation for assembling the roof 3.

The pairs of pre-assembled roof panels 8 are then attached to the respective roof heads 38, which are carried by the jack assemblies 10, by inserting the nuts, which are employed to attach the adjoining side edges of adjacent panels 8 together, into locking engagement with the keyhole openings 50. By this procedure a pair of pre-assembled roof panels 8 is hung from each of the jack assemblies 10. This is best shown in Fig. 5.

An intermediate roof panel 8 is then disposed between adjacent pairs of roof panels and secured to the respective side edge portions of the pairs by bolts to form an integral roof. Depending on the diameter of the silo and the weight of roof panels 8, it is contemplated that the roof panels may be of sufficient size so that the side edges between adjacent pairs of roof panels could be secured together to form the roof without the insertion of the intermediate panels. The roof is then completed by attachment of the circular crown 9 to the open inner portion of the panels at the center of the roof.

The entire roof is suspended solely from the lifting heads 38. There is no internal structure required to support the roof during assembly and thus there is no problem of removing internal roof bracing and supports from the interior of the silo after assembly of the roof. In addition, the roof is assembled at substantially ground level so that no expensive and cumbersome scaffolding is required in order to enable the erecting crew to assemble the roof as is ordinarily necessary.

After assembly of the roof, the roof is sufficiently elevated through operations of jack assemblies 10 to permit the upper edge of the panels forming the uppermost cylindrical section to be attached in overlapping relation to the lower edge of the roof. The overlapping vertical side edges of the panels 7 of the uppermost section and bolted together to form an integral section 6.

With the uppermost of the sections 6 attached to the roof, the assembled portion is then lowered until the lower edge of the uppermost section rests on blocks 69.

The blocks 69 are generally U-shaped members which fit over the upper edge of the lowermost cylindrical section and are provided with a wooden supporting surface 70 disposed in position to receive the lower edge of the sections 6 as the same are lowered. With the assembled portion of the silo supported by blocks 69, the nut housings 32 are lowered further, causing pegs 46 of jack assemblies 10 to be disengaged from the respective openings 54 in roof panel lifting heads 38. The heads are then detached from the roof panels 8. The side wall heads 39 are then attached to the nuts disposed along the vertical joints of the uppermost section. The side wall heads 39 are then locked to the nuts.

The nut housings 32 are then raised through rotation of screw 24 until the pegs 46 on bar 45 move into the corresponding openings in side wall head 39. Continued elevation of nut housing 32 will then lift the head 39 and the attached assembled structure. The structure is elevated to a position which will permit the next cylindrical section to be attached to the lower edge of the preceding assembled section 6.

The next series of panels 7 is attached to the assembled portion to form the succeeding cylindrical section 6 in a manner similar to that of the attachment of the uppermost of the sections 6 to roof 3. The assembled portion is again lowered onto blocks 69 and the side wall heads 39 are removed from the succeeding section and re-engaged with the vertical joint nuts of the newly completed lower section. The structure is then elevated to a position where the next cylindrical section can be attached to the completed structure. This procedure is repeated until all of the cylindrical sections 6 have been attached to the preceding sections.

At this time the blocks 69 are removed and the structure is backed down so that the lower edge of the last assembled section is in lapping relation with the upper edge of the lowermost section and in position to be attached thereto by the customary bolts. With this attachment, the structure is completely assembled.

The present invention provides an inexpensive and effective method of erecting a storage vessel. The supporting structure and scaffolding are located on the exterior of the vessel so that it may be conveniently assembled from a minimum of parts and readily disassembled on completion of the erection operation.

The roof of the vessel or silo is assembled at ground level where the working crew may conveniently handle the roof panels and other equipment without the need of scaffolding.

The assembled structure is supported by the engagement of the lifting heads 38 and 39 with the necked-down nuts disposed on the outer surface of the silo. By this procedure the nuts serve a dual purpose, for they, in combination with the bolts, serve to join the panels and also serve as an engagement for the lifting heads 38. This eliminates the requirement for other temporary attachments through which the lifting heads may act.

Various embodiments of the invention may be employed within the scope of the following claims.

We claim:

1. An apparatus for erecting storage structures or the like having a plurality of cylindrical vertically disposed successively adjoined sections, which comprises a plurality of jack assemblies circumferentially spaced and secured to the outer surface of the lowermost of said sections, a lifting head associated with each jack assembly and adapted to move vertically thereon, each of said heads serving to removably engage projections disposed on the outer surface of said cylindrical sections, means interconnecting said jack assemblies, and means to drive said interconnecting means to raise or lower the cylindrical sections by simultaneous raising or lowering of said lifting heads.

2. An apparatus for erecting a generally cylindrical storage structure having a roof formed of a plurality of panels, which comprises a plurality of vertically disposed jacks circumferentially spaced outwardly of said structure, a lifting head removably connected to each jack assembly and extending inwardly therefrom over said structure and adapted to engage a series of spaced connecting members employed to secure the adjoining edge portions of the adjacent roof panels together as a pair, said head serving to support said pairs of roof panels while the same are assembled to form said roof, means interconnecting said jack assemblies, and a drive member to drive said interconnecting means to simultaneously raise the lifting heads to a position whereby the body of said structure may be attached to the assembled roof.

3. An apparatus for erecting a storage structure having a plurality of adjoined cylindrical sections supported on a foundation and enclosed at the top by a roof formed of a plurality of generally pie-shaped panels, which comprises a plurality of vertically disposed jacks circumferentially spaced outwardly of said structure, a lifting head removably connected to each jack assembly and extending inwardly therefrom over said structure and provided with a plurality of openings to receive a series of connecting members employed to secure the adjoining edge portions of adjacent roof panels together as a pair, means to lock said connecting members within said respective openings, each head serving to carry one of said pairs of roof panels while an intermediate roof panel is secured between adjacent pairs to form said roof, means interconnecting said jack assemblies, and a drive member to drive said interconnecting means to simultaneously raise the lifting heads to a position whereby the uppermost of said cylindrical sections may be attached to the assembled roof.

4. An apparatus for erecting a storage structure formed of a plurality of vertically disposed successively adjoined cylindrical sections, said sections being formed of a series of generally curved panels joined together along their vertical side edges with the joined vertical edges of each section being offset from the joined vertical edges of the adjacent sections which comprises, a plurality of vertically disposed screw jacks circumferentially disposed and removably connected to the outer surface of the lowermost cylindrical section, a movable member threadedly engaged with each of said screw jacks and adapted to move vertically thereon in accordance with rotation of said jacks, a plurality of spaced upstanding members connected to said movable members adjacent the cylindrical sections and spaced arcuately in accordance with the amount of offset between the joined vertical edges of adjacent sections, a lifting head removably engageable with at least two of said upstanding members and adapted to receive in locking engagement a series of connecting members disposed along the joined vertical edges of said sections, said head adapted to be interchanged on said upstanding members to position said head in general alignment with the connecting members of the particular section to be engaged, and means to actuate said jack screws to simultaneously raise and lower said sections as desired.

5. An apparatus for erecting the roof of a generally cylindrical storage structure, said roof formed of a plurality of segments, which comprises a plurality of vertically disposed jack assemblies circumferentially disposed outwardly of said structure, and a head connected to each jack assembly and extending radially inward over said structure, said heads adapted to engage a series of connecting members employed to secure the adjoining side edge portions of adjacent roof panels together as a pair with each of said heads serving to carry one of said pairs of roof panels while the roof panels are secured together to form the roof.

6. An apparatus for erecting the roof of a generally cylindrical storage structure, said roof formed of a plurality of radical segments, which comprises a plurality of vertically disposed jacks circumferentially disposed outwardly of said structure, a movable member connected to each jack and adapted to move vertically thereon, said member provided with a plurality of upstanding members disposed adjacent said structure, and a head having a plurality of openings in position to receive said upstanding members and extending inwardly therefrom over said structure, said heads adapted to engage a series of connecting members employed to secure the adjoining side edge portions of adjacent roof panels together as a pair with each of said heads serving to carry one of said pairs of roof panels while the roof panels are joined together to form the roof, means for interconnecting said jacks, and means for driving said interconnecting means to simultaneously raise said movable members on the respective jacks and thereby raise said roof to a predetermined height.

7. An apparatus for erecting the roof of a generally cylindrical storage structure, said roof formed of a plurality of generally pie-shaped segments, which comprises a plurality of vertically disposed jack assemblies circumferentially spaced outwardly of said structure, and a head connected to each jack assembly and extending radially inward over said structure, said heads having a series of openings therethrough in position to receive a plurality of connecting members employed to secure the adjoining side edge portions of adjacent roof panels together as a pair, means for locking said connecting members within the respective openings to permit each of said heads to carry one of said pairs of roof panels while the roof panels are joined together to form the roof, means to simultaneously actuate said jack assemblies to raise or lower said heads thereon and effect a corresponding raising or lowering of said roof, and means to prevent said head from pivoting about said jack assembly due to the moment arm produced by the weight of said panels suspended from said head.

8. An apparatus for supporting the roof of a storage structure during assembly of said structure which comprises, a plurality of vertically disposed jack assemblies circumferentially spaced about said structure, and a lifting head removably engaged with each jack assembly and adapted to engage a series of projecting connecting members on the outer surface of said roof, said lifting head including a plate extending radially inward over said structure from the respective jack assemblies and disposed at an angle to permit said plate to be in a substantially flatwise relation with said roof, said plate being provided with a plurality of openings disposed in position to receive a series of said connecting members in locking engagement to prevent relative vertical movement between the head and said roof.

9. An apparatus for erecting a storage structure having a plurality of cylindrical vertically disposed adjoined sections supported on a foundation and enclosed at the top by a roof formed of a plurality of panels, which comprises a plurality of vertically disposed jacks circumferentially spaced outwardly of said structure, a lifting head removably connected to each jack assembly and extending inwardly therefrom over said structure and adapted to engage a series of projections on the outer surface of said roof panels to support said panels while the same are joined together to form said roof, means interconnecting said jack assemblies, means to drive said interconnecting means to simultaneously raise the lifting heads to elevate the roof after assembly thereof, and a second lifting head to replace said first named lifting head after said sections have been joined to said roof to removably engage projections on the outer surface of said cylindrical sections and raise and lower the sections with the attached roof in accordance with movement of said interconnecting means.

10. An apparatus for erecting a storage structure having a plurality of cylindrical vertically disposed adjoined sections supported on a foundation and enclosed at the top by a roof, said cylindrical sections and said roof formed of a plurality of panels, which comprises a plurality of vertically disposed jacks circumferentially spaced outwardly of said structure, a lifting head associated with each jack assembly and adapted to move vertically thereon, said heads extending inwardly from the respective jack assemblies over the structure and adapted to removably engage a series of connecting members disposed on the outer surface of said roof panels, said connecting members employed to secure adjoining side edge portions of adjacent panels together as a pair, each of said heads serving to carry one of said pairs of panels while the roof panels are connected together to form the roof, a second lifting head to replace said first named lifting head after assembly of said roof and disposed in position to removably engage a series of connecting members employed to secure adjoining side edges of adjacent panels of said cylindrical sections, and means to actuate said jack assemblies to simultaneously raise and lower the respective first and second named lifting heads to correspondingly raise and lower the roof and the cylindrical sections.

11. A method of erecting a storage structure formed of a plurality of vertically disposed successively adjoined cylindrical sections, and supported on a foundation which comprises, assembling the lowermost of said sections on the foundation, attaching a plurality of vertically disposed jack assemblies to the outer surface of said lowermost section, engaging a lifting head with a series of connecting members disposed on the outer surface of the uppermost of said sections, connecting a lifting head to each of said jack assemblies, actuating said jack assemblies to elevate said uppermost section, attaching the next succeeding lower section to said uppermost section, re-engaging the lifting head with said next succeeding lower section, and repeating the steps of elevating the sections and attaching the next succeeding sections to the previously assembled sections until all of the cylindrical sections have been assembled.

12. A method of erecting a storage structure formed of a plurality of vertically disposed successively adjoined cylindrical sections and supported on a foundation and enclosed at the top by a roof, said roof formed of a plurality of segmental panels, which comprises assembling the lowermost cylindrical section on said foundation, attaching a plurality of vertically disposed jack assemblies to the outer surface of said lowermost section, connecting at least one of said roof panels to each jack assembly, securing the roof panels together to form the roof, attaching the uppermost cylindrical section to the roof, and progressively elevating the completed portion of the structure through operation of said jack assemblies to permit each lower succeeding cylindrical section to be assembled to the previously completed portion of the structure.

13. A method of erecting a storage structure formed of a plurality of vertically disposed successively adjoined cylindrical sections, said structure supported on a foundation and enclosed at the top by a roof, which comprises assembling the lowermost cylindrical section on said foundation, attaching a plurality of vertically disposed jack assemblies to the outer surface of said lowermost section, engaging a lifting head with a series of connecting members disposed on the outer surface of a segment of said roof, connecting one of said lifting heads with the attached roof segment to each jack assembly with said heads extending inwardly from the respective jack assemblies over the structure, disposing roof segments between the roof segments supported by said lifting heads and securing the adjoining edges of adjacent roof segments together to form the roof, attaching the uppermost cylindrical section to the roof, and progressively re-engaging the lifting head with the assembled cylindrical sections elevating the completed portion of the structure through operation of said jack assemblies to permit each lower succeeding cylindrical section to be attached to the previously completed portion of the structure.

14. A method of erecting a storage structure formed of a plurality of vertically disposed successively adjoined cylindrical sections, said structure supported on a foundation and enclosed at the top by a roof, which comprises assembling a plurality of circumferentially spaced vertically disposed jack assemblies on said foundation, suspending a segment of said roof from each of said jack assemblies with said segments extending inwardly from the respective jack assemblies and being free of underprops, securing the adjacent edge portions of said roof segments together to form the roof, attaching the uppermost cylindrical section to said roof, and progressively re-connecting the jack assemblies with the assembled cylindrical sections and elevating the assembled portion of the structure through operation of said jack assemblies to permit each lower succeeding cylindrical section to be attached to said assembled portion.

15. A method of assembling the roof of a generally cylindrical storage structure, said roof formed of a plurality of segments connected together along adjoining edges, which comprises assembling a plurality of circumferentially spaced vertically disposed supporting members outwardly of the structure, suspending a separate roof segment from each supporting member with said segments extending inwardly from the respective supporting members toward the center of said structure, and securing the adjoining edges of the adjacent segments together to form said roof.

16. A method of assembling the roof of a generally cylindrical storage structure, said roof formed of a plurality of panels connected together along adjoining edges, which comprises assembling a plurality of circumferentially spaced vertically disposed supporting members outwardly of the structure, connecting a head to each of said supporting members, said heads extending inwardly from the respective supporting members toward the center of said structure, engaging each of said heads with a series of connecting members disposed on the outer surface of said roof panels and employed to secure adjoining edge portions of adjacent panels together as a pair, and securing the adjoining edge portions of adjacent pairs of roof panels together to form said roof with said roof being supported during assembly solely by said heads.

17. A method of erecting a storage structure formed of a plurality of vertically disposed successively adjoined cylindrical sections, said structure supported on a foundation and enclosed at the top by a roof, which comprises assembling the lowermost cylindrical section on said foundation, attaching a plurality of vertically disposed jack assemblies to the outer surface of said lowermost section, engaging a lifting head with a series of connecting members disposed on the outer surface of a segment of said roof, connecting one of said lifting heads with the attached roof segment to each jack assembly with said heads extending inwardly from the respective jack assemblies over the storage structure, securing the adjoining edge portions of adjacent roof segments together to form the roof, replacing each said first named lifting heads with a second head and engaging said second heads with a series of connecting members disposed on the outer surface of the uppermost cylindrical section, and progressively elevating the assembled portion of said structure through operation of said jack assemblies to permit each lower succeeding cylindrical section to be attached to said assembled portion.

18. In an apparatus to erect a storage structure formed of a plurality of vertically disposed successively adjoined cylindrical sections, a head carried by a vertical support and adapted to engage a series of vertically spaced connecting members disposed on the outer surface of said sections, said head having a series of openings therethrough spaced in accordance with the spacing of said connecting members and adapted to receive said connecting members, and a wedging member associated with said head and having a series of diagonally extending slots therein aligned with said openings in said head and disposed in position to receive said connecting members, said wedging member adapted to be moved horizontally to lock said connecting members within the respective openings in said head to enable said sections to be moved vertically in accordance with movement of said head.

19. In an apparatus for erecting a storage structure formed of a plurality of generally curved panels secured together along their adjoining horizontal and vertical edges by a plurality of connecting members, a head carried by a vertical support disposed outwardly of said structure, said head including a channel member disposed in substantial contacting relation with the outer surface of said structure and having a plurality of openings therethrough disposed in position to receive a series of said connecting members, and a locking member slidably disposed within aligned holes in the opposed flanges of said channel plate and having a diagonally extending elongated opening therein in alignment with one of said openings in the channel member and adapted to receive one of said series of connecting members, said locking member adapted to slide laterally in relation to said series of connecting members to wedgingly lock said connecting members within the openings in said channel member and permit said structure to be raised and lowered in accordance with movement of said head.

20. In an apparatus for erecting a storage structure formed of a plurality of generally curved panels secured together along their adjoining horizontal and vertical edges by a plurality of connecting members, a head carried by a vertical support disposed outwardly of said structure, said head disposed adjacent the outer surface of said panels and comprising a pair of pivotally connected arms with the adjacent opposed edges of said arms being provided with complementary notches, said connecting members having a necked-down portion adapted to be received within the respective complementary notches, and means to secure said arms together and lock said connecting members within the complementary notches of the arms to enable said structure to be moved in accordance with movement of said head.

21. A method of erecting a storage structure formed of a plurality of vertically disposed successively adjoined cylindrical sections, said sections being formed of a plurality of generally curved panels joined along their vertical side edges by a plurality of connecting members with the joined vertical edges of each of said sections being offset from the joined vertical edges of the adjacent sections, which comprises assembling a plurality of vertical jack assemblies outwardly of said structure in a circumferentially spaced relation to said structure, said jack assemblies including a vertically movable member having a plurality of upstanding members attached thereto, said upstanding members disposed adjacent said structure and circularly spaced in accordance with the amount of offset of the joined vertical edges of said sections, attaching a lifting head to a series of said connecting members associated with the uppermost cylindrical section, engaging a series of said upstanding members of each movable member within corresponding openings in a lifting head, actuating said jack assemblies to move said movable members and said heads and elevate said uppermost section, attaching the next succeeding lower section to said uppermost section, withdrawing said upstanding members from said opening to disengage said jack assemblies from said uppermost section, removing said heads from attachment with the connecting members of said uppermost section, re-atttaching said heads with a series of connecting members associated with said next succeeding lower section, and engaging a second series of said upstanding members with the openings in said head in preparation for elevation of the assembled portion of the structure, said second series of upstanding members being chosen in accordance with the amount of offset between the joined vertical edges of the uppermost section and said next succeeding lower section.

22. In an apparatus for erecting a storage structure having a plurality of cylindrical vertically disposed successively adjoined sections, a plurality of circumferentially spaced vertically disposed screw jacks, a lifting head associated with each screw jack and adapted to engage a series of vertically spaced connecting members disposed on the outer surface of the sections, said head comprising a backing member having a series of openings therethrough spaced in accordance with the spacing of said connecting members and adapted to receive said connecting members, a wedging member associated with said backing member and having a series of diagonally extending slots therein aligned with said openings in said backing member and disposed in position to receive said connecting members, said wedging member being adapted to be moved horizontally to lock said connecting members within the respective openings in said backing member to enable said sections to be moved vertically in accordance with movement of said head, means interconnecting the screw jacks, and means to drive said interconnecting means to raise and lower the cylindrical sections.

References Cited in the file of this patent

UNITED STATES PATENTS

| | | |
|---|---|---|
| 1,839,578 | Morton | Jan. 5, 1932 |
| 2,323,450 | Brosco | July 6, 1943 |
| 2,360,417 | Grenfell | Oct. 17, 1944 |
| 2,605,540 | Kroll | Aug. 5, 1952 |
| 2,627,390 | Schiefelbein | Feb. 3, 1953 |
| 2,631,008 | Kroll | Mar. 10, 1953 |

FOREIGN PATENTS

| | | |
|---|---|---|
| 617,835 | France | Nov. 29, 1926 |